US012126965B2

United States Patent
Olson et al.

(10) Patent No.: US 12,126,965 B2
(45) Date of Patent: Oct. 22, 2024

(54) BUTTONLESS ON/OFF SWITCH FOR HEARING ASSISTANCE DEVICE

(71) Applicant: Starkey Laboratories, Inc., Eden Prairie, MN (US)

(72) Inventors: Kyle Olson, St. Louis Park, MN (US); Sidney A. Higgins, Maple Grove, MN (US)

( * ) Notice: Subject to any disclaimer, the term of this patent is extended or adjusted under 35 U.S.C. 154(b) by 151 days.

(21) Appl. No.: 17/634,892

(22) PCT Filed: Aug. 13, 2020

(86) PCT No.: PCT/US2020/046180
§ 371 (c)(1),
(2) Date: Feb. 11, 2022

(87) PCT Pub. No.: WO2021/030585
PCT Pub. Date: Feb. 18, 2021

(65) Prior Publication Data
US 2022/0295198 A1 Sep. 15, 2022

Related U.S. Application Data

(60) Provisional application No. 62/887,136, filed on Aug. 15, 2019.

(51) Int. Cl.
*H04R 25/00* (2006.01)

(52) U.S. Cl.
CPC ......... *H04R 25/558* (2013.01); *H04R 25/552* (2013.01); *H04R 2225/021* (2013.01); *H04R 2225/61* (2013.01)

(58) Field of Classification Search
None
See application file for complete search history.

(56) References Cited

U.S. PATENT DOCUMENTS

| | | | | |
|---|---|---|---|---|
| 8,238,567 | B2 * | 8/2012 | Burge | H04R 1/1041 381/71.6 |
| 10,623,871 | B2 * | 4/2020 | Oesch | H04R 25/505 |
| 10,845,379 | B1 * | 11/2020 | Bhandari | G01P 15/0888 |
| 10,873,798 | B1 * | 12/2020 | Jackson | G06F 3/017 |
| 11,812,246 | B2 | 11/2023 | Higgins et al. | |
| 2015/0341973 | A1 | 11/2015 | El-Hoiydi et al. | |

(Continued)

FOREIGN PATENT DOCUMENTS

| | | | |
|---|---|---|---|
| CN | 108848429 | A | 11/2018 |
| EP | 3151584 | A2 | 4/2017 |

(Continued)

OTHER PUBLICATIONS

"International Application Serial No. PCT/US2020/046180, International Search Report mailed Nov. 16, 2020", 4 pgs.

(Continued)

*Primary Examiner* — Paul W Huber

(57) ABSTRACT

A hearing assistance device may be turned on or off in response to a change in magnetic field or detection of a gesture. A magnetic sensor may be used to identify a change in a magnetic field. An inertial measurement unit or other force sensor may be used to detect a gesture. In response to the magnetic field change or gesture, a hearing assistance device may be caused to change a device function or change a device power mode.

20 Claims, 5 Drawing Sheets

(56) References Cited

U.S. PATENT DOCUMENTS

| | | | | |
|---|---|---|---|---|
| 2017/0289671 | A1* | 10/2017 | Patel | H04R 1/1041 |
| 2017/0374477 | A1* | 12/2017 | Salvatucci | H04R 25/554 |
| 2018/0132287 | A1 | 5/2018 | Cheng et al. | |
| 2019/0268703 | A1 | 8/2019 | Solum et al. | |
| 2022/0083149 | A1* | 3/2022 | Keller | G06F 3/0233 |
| 2022/0150615 | A1* | 5/2022 | Honeycutt | H04R 1/105 |

FOREIGN PATENT DOCUMENTS

| | | | |
|---|---|---|---|
| EP | 3226577 | A1 | 10/2017 |
| EP | 3264798 | A1 | 1/2018 |
| WO | WO-2021030585 | A1 | 2/2021 |

OTHER PUBLICATIONS

"International Application Serial No. PCT/US2020/046180, Written Opinion mailed Nov. 16, 2020", 7 pgs.
"International Application Serial No. PCT/US2020/046180, International Preliminary Report on Patentability mailed Feb. 24, 2022", 9 pgs.
"International Application Serial No. PCT/US2020/061333, International Search Report mailed Feb. 26, 2021", 9 pgs.
"European Application Serial No. 20761703.6, Communication pursuant to Article 94(3) EPC mailed May 2, 2024", 7 pgs.

* cited by examiner

BUTTONLESS ON/OFF SWITCH FOR HEARING ASSISTANCE DEVICE

CLAIM OF PRIORITY

This patent application is a U.S. National Stage Filing under U.S.C. 371 from International Application No. PCT/US2020/046180, filed on Aug. 13, 2020, and published as WO 2021/030585 on Feb. 18, 2021, which claims the benefit of priority to U.S. Provisional Application Ser. No. 62/887,136, filed Aug. 15, 2019, each of which are incorporated by reference herein in their entirety.

BACKGROUND

Hearing devices provide sound for the wearer. Examples of hearing devices include headsets, hearing assistance devices, speakers, cochlear implants, bone conduction devices, and personal listening devices. Hearing assistance devices provide amplification to compensate for hearing loss by transmitting amplified sounds to ear canals. In various examples, a hearing assistance devices is worn in or around a patient's ear. Hearing assistance devices have batteries and occasionally need to be turned on or off.

DETAILED DESCRIPTION

Systems and methods described herein may be used to activate a low power mode or turn off a hearing assistance device. A magnetic sensor or an inertial measurement unit (IMU) may be used to identify that the low power mode or off mode is indicated. In an example, the IMU may be used alone or together with one or more gesture detection sensors, such as may include an accelerometer.

Typically, users need to press a button or remove a battery to turn hearing assistance devices off. With the advent of rechargeable hearing aids removing the battery may no longer be an option. Additionally there is limited space and buttons take up valuable real estate on the hearing assistance device outer case. To save space the buttons are usually dual purpose and it may be difficult for a user to remember what to do to control the device with single, double, long, very long and other button press types.

Buttons on a hearing assistance device are also a point of material ingress and reduce waterproofing. Using an IMU, capacitive switches, or other sensors to create a button is possible but is prone to false positives which are inconvenient and annoying for users for an ON/OFF switch.

The systems and methods described herein may include or use information from a magnetic sensor (e.g., a Hall effect sensor, a giant magnetoresistance (GMR) sensor, a tunnel magnetoresistance (TMR) sensor, a reed switch, or the like) and an IMU to determine when to turn the device off or enter a low power mode. The magnetic sensor detects a change in magnetic field and the IMU senses a gesture (e.g., a double tap) to trigger the hearing assistance device to change a device function or power mode, for example, to enter a low power mode or turn off one or more components of the device.

In an example, in the low power mode only circuitry configured to detect or receive an IMU gesture interrupt or magnetic switch circuitry may be active. When a change in magnetic field or a gesture is detected when in the low power mode or off, the hearing assistance device may exit the low power mode or turn on.

Figure 1:
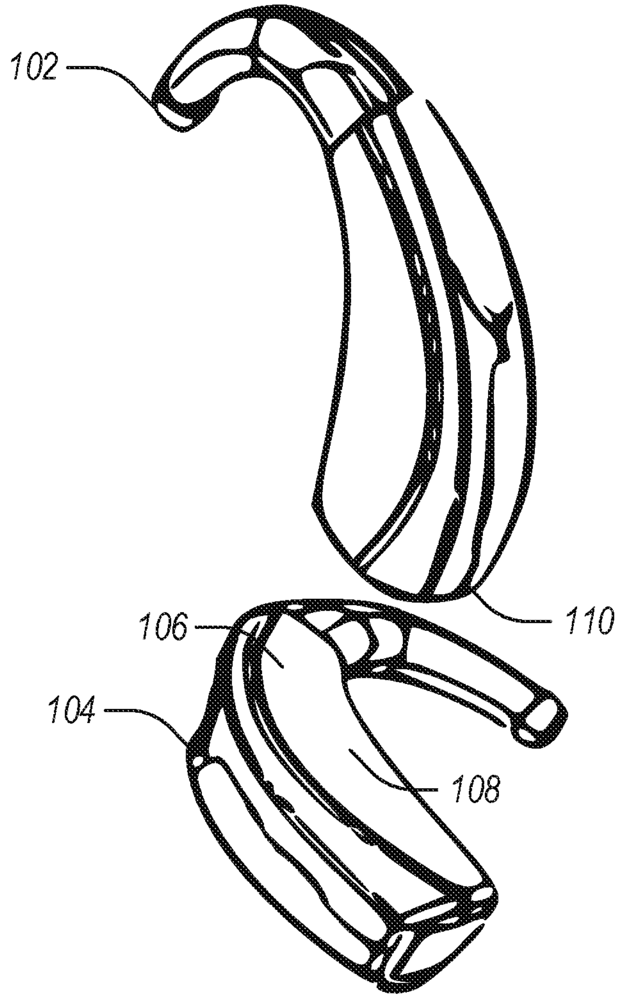
FIG. 1 illustrates a pair of hearing assistance devices according to an example.

FIG. 1 illustrates a pair of hearing assistance devices 102 and 104 according to an example. The first hearing assistance device 102 may be paired with the second hearing assistance device 104. One or both of the hearing assistance devices 102 and 104 may include a magnetic sensor (e.g., 106 on the second hearing assistance device 104), a magnet (e.g., 110 on the first hearing assistance device 102), or an IMU or other acceleration or force sensor (e.g., sensor 108 on the second hearing assistance device).

Other sensors may be used with or included in the hearing assistance devices 102 and 104, such as including one or more of a microphone, a proximity sensor, such as an optical heart rate sensor used in a low power proximity detection mode, a temperature sensor, or the like. The sensors described herein may be used to detect a gesture or to verify that a gesture has occurred (e.g., as a secondary measurement to prevent a user from accidentally turning off the hearing devices, such as with a regular magnet). Any of these described sensors (including 106, 108, or 110) may be used as a primary or backup sensor for detecting a gesture or occurrence to determine an action at one or both of the hearing assistance devices 102 and 104. The sensors described herein may be within a shell of a hearing assistance device, such as coupled to circuitry of the hearing assistance device for power or to provide data.

An action may include changing volume (e.g., of a speaker of one of hearing assistance devices 102 and 104), changing one of the hearing assistance devices 102 and 104 to a low power, high power, off, or on mode, changing profiles of one of the hearing assistance devices 102 and 104, or the like.

In an example, the second hearing assistance device 104 may use the magnetic sensor 106 to detect that a magnetic field has changed, based on the first hearing assistance device 102 being within proximity of the second hearing assistance device. The second hearing assistance device 104 may use the IMU 108 to detect that the first hearing assistance device 102 has struck the second hearing assistance device. The combination of these two detections (the change in magnetic field and the change in acceleration or force) may be used to cause an action at the first or the second hearing assistance devices 102 or 104. For example, the second hearing assistance device 104 may turn off or enter a low power mode in response to the two detections. In an example, the second hearing assistance device 104 may send an indication to the first hearing assistance device 102 (e.g., via a low throughput wireless data connection) that the first device is also to turn off or enter a low power mode.

In an example, detecting a change in acceleration by the IMU 108 may include detecting multiple changes in acceleration, for example corresponding to a double tap of the first hearing assistance device 102 on the second hearing assistance device 104. The change in magnetic field may also be tracked during the double tap, in a manner corresponding to the motion of the first and second hearing assistance devices 102 and 104.

In other examples, such as additionally or alternatively to using the magnetic sensor 104 or the IMU 108, other sensors may be used to detect a gesture or other circumstances. For example a proximity sensor or a microphone may be used to verify that a gesture has occurred. In another example, a temperature sensor may be used to detect that an ambient temperature has increased (e.g., consistent with a user holding the hearing assistance device in a closed fist) to trigger an action.

Other gestures or combinations of gestures may be used, such as a triple tap, a single tap, a short tap, a long tap, a rotation, an in the air gesture (e.g., a sweep, zigzag, etc.), or the like. In another example, an orientation of one or both of the hearing assistance devices 102 and 104 may be used. For example, the second hearing assistance device 104 may be required to be at a particular orientation to receive a tap or gesture, such as horizontal to a gravity vector (which may be detected by the IMU 108). In another example, the particular orientation may be with respect to the first hearing assistance device 102 (e.g., requiring the two devices to be perpendicular).

In an example, the gesture may be detected by the second hearing assistance device 104 when the first hearing assistance device is off (e.g., the battery died or it was turned off) or in a low power mode. In some examples, no active components of the first hearing assistance device 102 are used to detect the gesture (e.g., only the magnet 110 of the first hearing assistance device 102 is used, which does not require power, the active components 106 and 108 of the second hearing assistance device 104 are used).

An action, a gesture, or their relatedness may be configurable. The action, gesture, or relatedness may be stored in memory, for example in non-volatile onboard memory in one or both of the hearing assistance devices 102 or 104.

Figure 2:
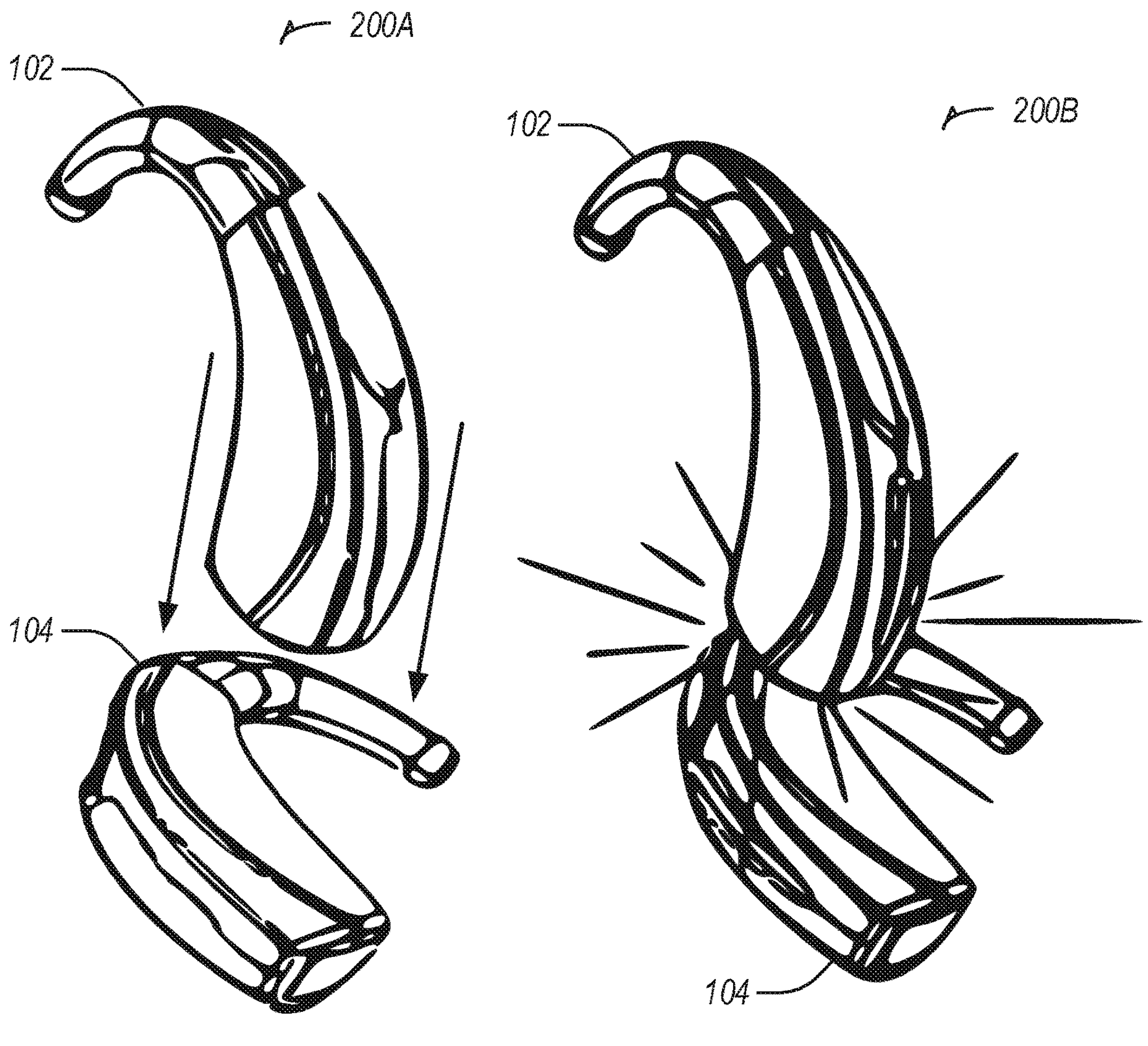
FIG. 2 illustrates a gesture performed using a pair of hearing assistance devices according to an example.

FIG. 2 illustrates a gesture performed using a pair of hearing assistance devices (e.g., the first hearing assistance device 102 and the second hearing assistance device 104 of FIG. 1) according to an example.

The gesture includes a first position 200A where the gesture is initiated by the first hearing assistance device 102 being moved toward the second hearing assistance device 104 (or vice versa). The second position 200B illustrates the end of a part of the gesture where the first and second hearing assistance devices 102 and 104 come into contact. The positions may be repeated for a double tap gesture. In an example, the first or second position 200A-200B or the combination (e.g., a directional component) may be used to determine whether a gesture has been performed (e.g., to trigger the hearing assistance device to change to a low power mode, turn off, etc.). For example, an IMU detecting one device being relatively horizontal and an IMU detecting the other device being relatively vertical or at a known direction (or relatively perpendicular to each other, regardless of absolute orientation) during a gesture, along with magnetic detection may trigger an action.

A gesture may be used to wake up the second hearing assistance device 104. For example, the second hearing assistance device 104 may be in a low power mode (e.g., providing power only to the IMU or the magnetic sensor or both, which may include a more limited frequency or sample size than in a high power mode), and upon detection of the gesture, the second hearing assistance device 104 may change to a high power mode (e.g., a fully powered mode). The low power mode may be a partially powered mode, such as where only one or a few sensors are powered (e.g., the IMU or the magnetic sensor).

In some examples, the second hearing assistance device 104 may not identify a change in magnetic field, so in response to a gesture, the second hearing assistance device 104 may wake up (e.g., leave a low power mode, at least temporarily) and listen for a signal from the first hearing assistance device 102. In another example, where both the first and the second hearing assistance devices 102 and 104 are in the low power mode, the second hearing assistance device 104 may send a signal to wake up the first hearing assistance device 102.

The gesture (or other gestures as described herein) may be used to perform actions other than changing to a low power or off mode, such as profile change (e.g., enter a music listening mode, ambient listening mode, autovent, etc.), change volume, access memories, pair to a device (e.g., another hearing assistance device, a phone, etc.), or the like.

Using the combination of a magnetic switch (e.g., a Hall effect sensor, a GMR, a TMR, a reed switch, or the like) and an IMU, a double tap gesture may be sensed, for example with a magnet, to trigger the second hearing assistance device 104 to enter a low power mode. In the low power mode only the IMU double tap interrupt and magnetic switch circuitry are active, or optionally only one or the other is active to thereby reduce power consumed. When another magnetic double tap is detected the second bearing assistance device may exit the low power mode. The magnet may be included in the first hearing assistance device 102 that is used to perform the double tap action. A low power state activation in one device may activate a low power state in the other device, for example based on a communication between the devices via ultrasonic, Bluetooth, etc. The magnet may have a dual purpose for making a more secure connection with recharging contacts of a device and charger.

In an example, the gesture may be location restricted, such that a gesture occurring within a particular location (e.g., near the magnetic sensor) may trigger an action, but a gesture that occurs outside that location may not. In an example, the gesture may be time constrained, for example detection of a magnetic field and a tap or change in acceleration or force may be required to occur within a particular time window, such as a few milliseconds. A tap and a change in magnetic field where one occurs outside the window of the other may not result in an action being taken.

A force or acceleration threshold for the gesture may be used. For example, force on the IMU may have a minimum, a maximum, or a range to trigger an action. The threshold or range may be configurable (e.g., customized to a user). In a double tap gesture example, the second tap may be required to be within a range of the first tap (e.g., for force or acceleration change). There may be a maximum or minimum time between taps, for example, 1 second, 1.5 seconds, etc.

Figure 3:
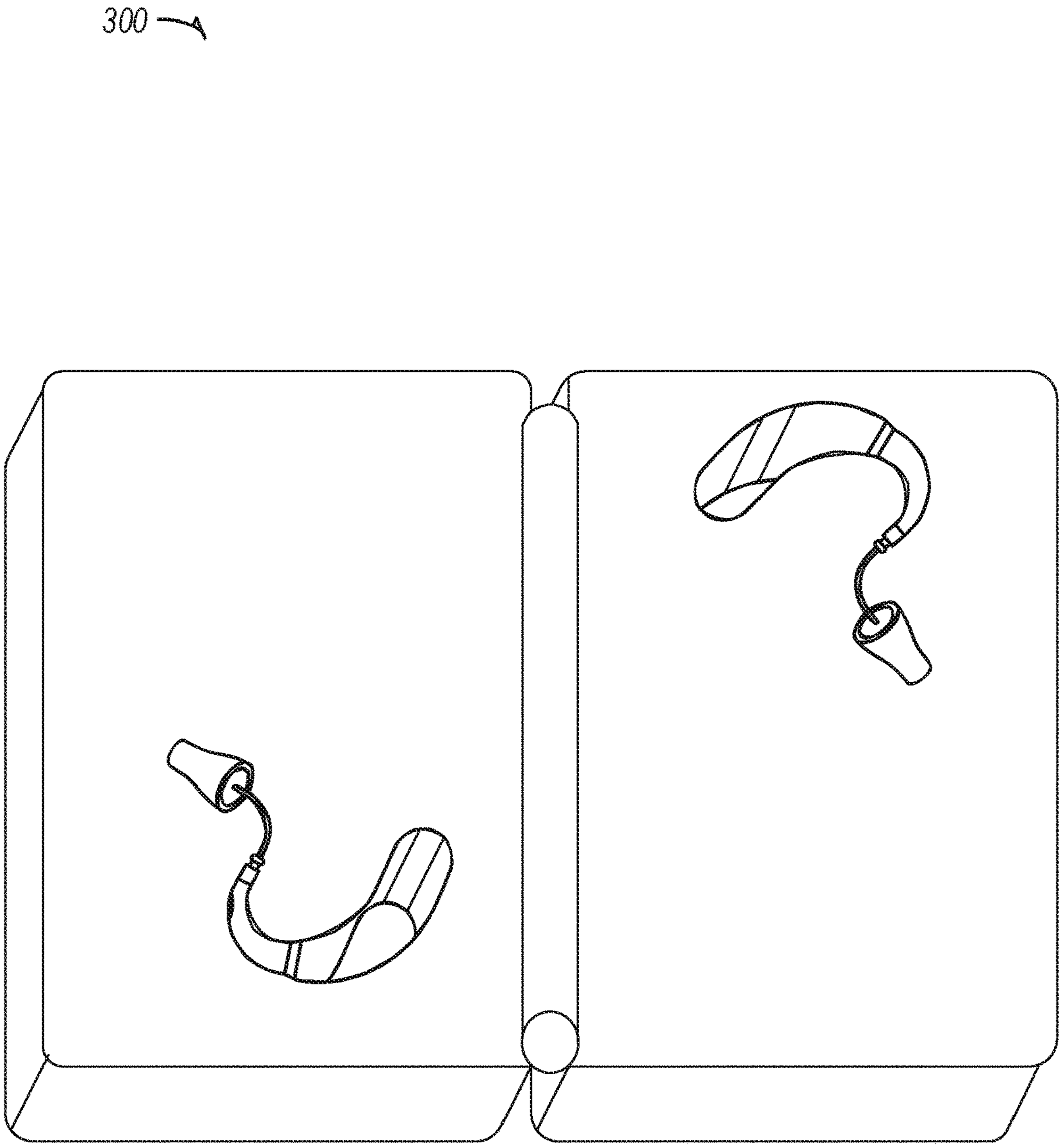
FIG. 3 illustrates a charging case for a hearing assistance device according to an example.

FIG. 3 illustrates a charging case 300 for a hearing assistance device according to an example. The charging case 300 may be used with the hearing assistance devices described herein. In an example, a pair of devices is used in the charging case 300. In another example, a single device is used in the charging case 300.

A magnetic sensor in a hearing assistance device being charged by the charging case 300 may allow the hearing assistance device to identify that it is leaving the charging case 300. In response to the identification, the hearing assistance device may be turned on or moved from a low power mode to a higher power mode.

The magnetic sensor in the hearing assistance device may be used to detect a change in magnetic field when the hearing assistance device is placed in the charging case 300. As a result of this detected change in magnetic field, an action may be taken in the hearing assistance device, such as to switch the hearing assistance device to a low power mode, turning the hearing assistance device off, or the like.

The charging case 300 may include a magnetic field to switch the device into a low power mode using a magnetic sensor. The magnetic sensor (e.g., of the hearing assistance device) may have multiple thresholds to detect the difference in the magnet from the double tap or insertion into the charging case 300. In an example, the GMR may detect a phone presence with a low field and not switch into low power mode or detect a large field such as one present in the charging case 300 and put the device into low power or off state.

In an example, a large magnetic field in the charging case 300 may keep the hearing assistance device off or in a low power mode, even when the charging case 300 runs out of battery. The hearing assistance device may turn on or leave the low power mode when leaving the large magnetic field, even when the charging case 300 battery is dead.

Figure 4:
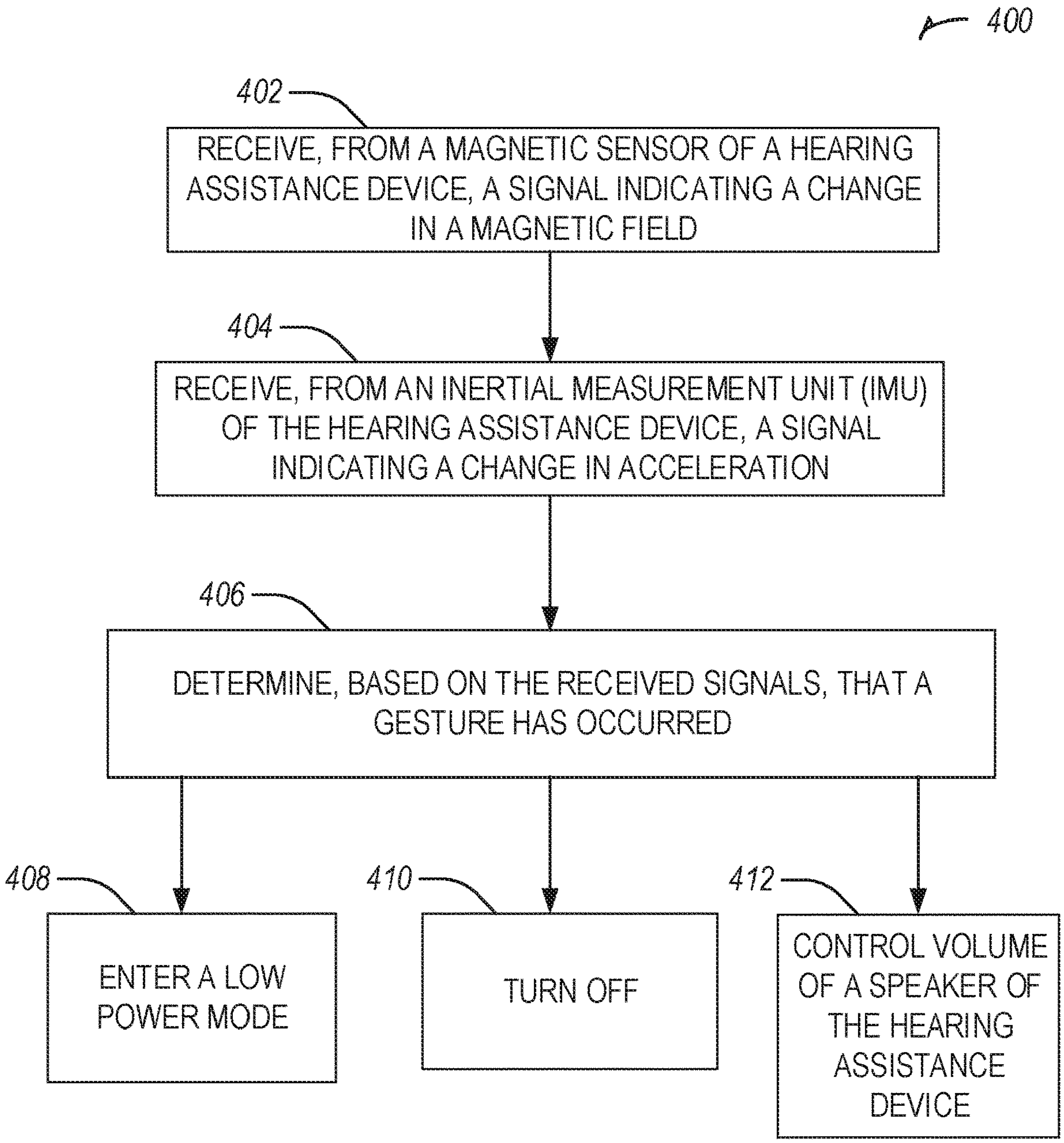
FIG. 4 illustrates a flowchart showing a technique for controlling aspects of a hearing assistance device using a gesture and a change in magnetic field according to an example.

FIG. 4 illustrates a flowchart showing a technique 400 for controlling aspects of a hearing assistance device using a gesture and a change in magnetic field according to an example.

The technique 400 includes an operation 402 to receive, from a magnetic sensor of a hearing assistance device, a signal indicating a change in a magnetic field. In an example, the magnetic sensor is a magnetometer sensitive to the giant magnetoresistance (GMR) effect.

The technique 400 includes an operation 404 to receive, from an inertial measurement unit (IMU) of the hearing assistance device, a signal indicating a change in acceleration The technique 400 includes an operation 406 to determine, based on the received signals, that a gesture has occurred.

In response to determining that the gesture has occurred, an action may be performed (e.g., a change in a device operating status of the hearing assistance device). The action may be performed when the specified change in the magnetic field and the change in acceleration occur within a specified time period. For example, the action may be performed when the specified change in the magnetic field occurs at a first time, and the gesture occurs at a second time. The first and second times may be within, for example, 1 second, 10 seconds, or within another interval or duration. In an example, the change in the magnetic field and the gesture may occur, at least in part, concurrently or at substantially the same time (e.g., within a few milliseconds). In an example, the change in the device operating status may include causing the hearing assistance device to enter a low power mode (e.g., by disconnecting power to some components of the hearing assistance device, such as all components other than at least one of the magnetic sensor or the IMU) or turning off power at the hearing assistance device (e.g., by disconnecting power from all components of the paired hearing assistance device).

The gesture may be, for example, a tap, a double tap, a long tap, a short tap, a combination of taps, or the like. The gesture may be performed using a paired hearing assistance device. In an example, detecting the gesture may include detecting an acceleration that exceeds a threshold acceleration (e.g., a minimum). The threshold acceleration may be personalized to a user, in an example. In an example, a second gesture may be detected, which may result in another action being performed (e.g., entering a shelf mode and turning all power off, such as described below with operation 410, controlling volume of a speaker of the hearing assistance device, such as described below with operation 412, pairing the hearing assistance device with another device e.g., phone or other hearing assistance device, or the like).

The technique 400 includes an operation 408 to perform the action (e.g., changing a device operating parameter), including for example entering a low power mode. The low power mode may include disconnecting power to all components of the hearing assistance device other than at least one of the magnetic sensor or the IMU.

The technique 400 includes an operation 410 to perform the action (e.g., changing a device operating parameter), including turning off the hearing assistance device (e.g., disconnecting all power, resetting the hearing assistance device to a shelf mode, etc.). Operation 410 may include turning off the hearing assistance device when the hearing assistance device is put in a case, based on a change in magnetic field caused by a magnet in the case. The hearing assistance device may be turned on when removed from the case.

The technique 400 includes an operation 412 to perform the action (e.g., changing a device operating parameter), including controlling volume of a speaker of the hearing assistance device.

Figure 5:
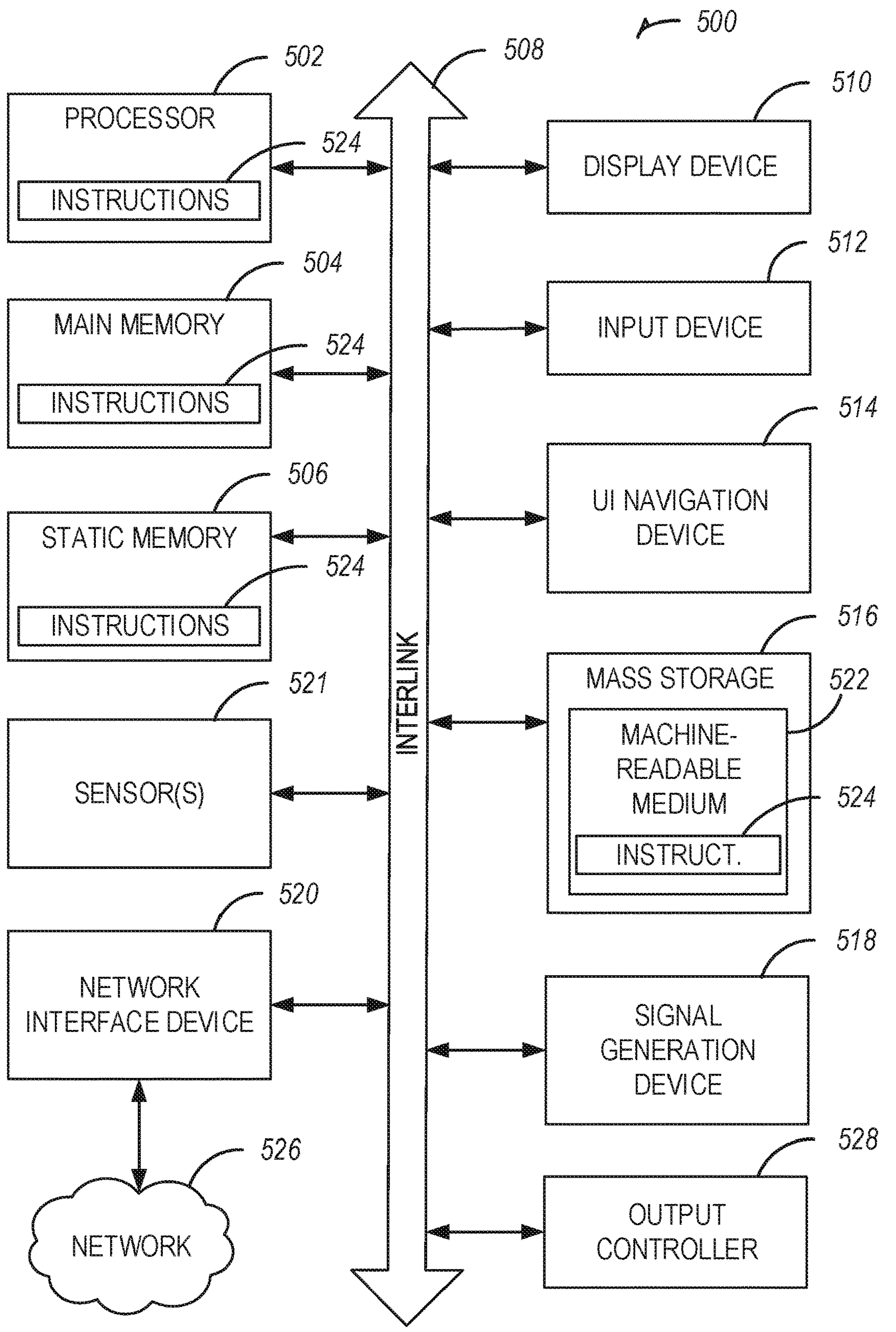
FIG. 5 illustrates generally an example of a block diagram of a machine upon which any one or more of the techniques discussed herein may be performed according to an example.

FIG. 5 illustrates generally an example of a block diagram of a machine 500 upon which any one or more of the techniques (e.g., methodologies) discussed herein may be performed according to an example. In an example, the machine comprises a portion of a hearing assistance device, or comprises a system that may include one or more hearing assistance devices. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, an audio signal processor, a hearing assistance device, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. For example, the example of the machine 500 may represent paired hearing assistance devices with communicatively coupled components.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, alphanumeric input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In an example, the machine 500 may include various other sensors such as a magnetic sensor configured to detect or identify a change in a magnetic field in or near the machine 500, or an inertial measurement unit configured to detect or identify a gesture or specified movement or pattern of movements.

The storage device 516 may include a machine readable medium 522 that is non-transitory on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Hearing assistance devices typically include at least one enclosure or housing, a microphone, hearing assistance device electronics including processing electronics, and a speaker or "receiver." Hearing assistance devices may include a power source, such as a battery. In various embodiments, the battery may be rechargeable. In various embodiments multiple energy sources may be employed. It is understood that in various embodiments the microphone is optional. It is understood that in various embodiments the receiver is optional. It is understood that variations in communications protocols, antenna configurations, and combinations of components may be employed without departing from the scope of the present subject matter. Antenna configurations may vary and may be included within an enclosure for the electronics or be external to an enclosure for the electronics. Thus, the examples set forth herein are intended to be demonstrative and not a limiting or exhaustive depiction of variations.

It is understood that digital hearing assistance devices include a processor. In digital hearing assistance devices with a processor, programmable gains may be employed to adjust the hearing assistance device output to a wearer's particular hearing impairment. The processor may be a digital signal processor (DSP), microprocessor, microcontroller, other digital logic, or combinations thereof. The processing may be done by a single processor, or may be distributed over different devices. The processing of signals referenced in this application may be performed using the processor or over different devices. Processing may be done in the digital domain, the analog domain, or combinations thereof. Processing may be done using subband processing techniques. Processing may be done using frequency domain or time domain approaches. Some processing may involve both frequency and time domain aspects. For brevity, in some examples drawings may omit certain blocks that perform frequency synthesis, frequency analysis, analog-to-digital conversion, digital-to-analog conversion, amplification, buffering, and certain types of filtering and processing. In various embodiments the processor is adapted to perform instructions stored in one or more memories, which may or may not be explicitly shown. Various types of memory may be used, including volatile and nonvolatile forms of memory. In various embodiments, the processor or other processing devices execute instructions to perform a number of signal processing tasks. Such embodiments may include analog components in communication with the processor to perform signal processing tasks, such as sound reception by a microphone, or playing of sound using a receiver (i.e., in applications where such transducers are used). In various embodiments, different realizations of the block diagrams, circuits, and processes set forth herein may be created by one of skill in the art without departing from the scope of the present subject matter.

Various embodiments of the present subject matter support wireless communications with a hearing assistance device. In various embodiments the wireless communications may include standard or nonstandard communications. Some examples of standard wireless communications include, but not limited to, Bluetooth™, low energy Bluetooth, IEEE 802.11 (wireless LANs), 802.15 (WPANs), and 802.16 (WiMAX). Cellular communications may include, but not limited to, CDMA, GSM, ZigBee, and ultra-wideband (UWB) technologies. In various embodiments, the communications are radio frequency communications. In various embodiments the communications are optical communications, such as infrared communications. In various embodiments, the communications are inductive communications. In various embodiments, the communications are ultrasound communications. Although embodiments of the present system may be demonstrated as radio communication systems, it is possible that other forms of wireless communications may be used. It is understood that past and present standards may be used. It is also contemplated that future versions of these standards and new future standards may be employed without departing from the scope of the present subject matter.

The wireless communications support a connection from other devices. Such connections include, but are not limited to, one or more mono or stereo connections or digital connections having link protocols including, but not limited to 802.3 (Ethernet), 802.4, 802.5, USB, ATM, Fibre-channel, Firewire or 1394, InfiniBand, or a native streaming interface. In various embodiments, such connections include all past and present link protocols. It is also contemplated that future versions of these protocols and new protocols may be employed without departing from the scope of the present subject matter.

In various embodiments, the present subject matter is used in hearing assistance devices that are configured to communicate with mobile phones. In such embodiments, the hearing assistance device may be operable to perform one or more of the following: answer incoming calls, hang up on calls, and/or provide two way telephone communications. In various embodiments, the present subject matter is used in hearing assistance devices configured to communicate with packet-based devices. In various embodiments, the present subject matter includes hearing assistance devices configured to communicate with streaming audio devices. In various embodiments, the present subject matter includes hearing assistance devices configured to communicate with Wi-Fi devices. In various embodiments, the present subject matter includes hearing assistance devices capable of being controlled by remote control devices.

It is further understood that different hearing assistance devices may embody the present subject matter without departing from the scope of the present disclosure. The devices depicted in the figures are intended to demonstrate the subject matter, but not necessarily in a limited, exhaustive, or exclusive sense. It is also understood that the present subject matter may be used with a device designed for use in the right ear or the left ear or both ears of the wearer.

The present subject matter may be employed in hearing assistance devices, such as headsets, headphones, and similar hearing devices.

The present subject matter is demonstrated for hearing assistance devices, including hearing assistance devices, including but not limited to, behind-the-ear (BTE), in-the-ear (ITE), in-the-canal (ITC), receiver-in-canal (RIC), or completely-in-the-canal (CIC) type hearing assistance devices. It is understood that behind-the-ear type hearing assistance devices may include devices that reside substantially behind the ear or over the ear. Such devices may include hearing assistance devices with receivers associated with the electronics portion of the behind-the-ear device, or hearing assistance devices of the type having receivers in the ear canal of the user, including but not limited to receiver-in-canal (RIC) or receiver-in-the-ear (RITE) designs. The present subject matter may also be used in hearing assistance devices generally, such as cochlear implant type hearing devices and such as deep insertion devices having a transducer, such as a receiver or microphone, whether custom fitted, standard fitted, open fitted and/or occlusive fitted. It is understood that other hearing assistance devices not expressly stated herein may be used in conjunction with the present subject matter.

Each of the following non-limiting examples may stand on its own, or may be combined in various permutations or combinations with one or more of the other examples.

Example 1 is a hearing assistance device comprising: a magnetic sensor configured to output a magnetic field-indicating signal based on a change in a magnetic field at the hearing assistance device; an inertial measurement unit (IMU) configured to output an acceleration-indicating signal based on a change in acceleration at the hearing assistance device; and processing circuitry configured to: receive the magnetic field-indicating signal and the acceleration-indicating signal; determine that a gesture has occurred based on the received signals; and in response to determining that the gesture has occurred, change a device operating status of the hearing assistance device.

In Example 2, the subject matter of Example 1 includes, wherein the magnetic sensor is a magnetometer sensitive to the giant magnetoresistance (GMR) effect.

In Example 3, the subject matter of Examples 1-2 includes, wherein the processing circuitry is configured to cause the hearing assistance device to change the device operating status of the hearing assistance device when the change in the magnetic field and the change in acceleration occur within a specified time period.

In Example 4, the subject matter of Examples 1-3 includes, wherein to determine that the gesture has occurred, the processing circuitry is further configured to determine that a double tap has occurred on the hearing assistance device.

In Example 5, the subject matter of Examples 1-4 includes, wherein the processing circuitry is further configured to send an indication to a paired hearing assistance device, in response to determining that the gesture has occurred, the indication configured to cause the paired hearing assistance device to change a corresponding device operating status of the paired hearing assistance device.

In Example 6, the subject matter of Examples 1-5 includes, wherein to change the device operating status, the processing circuitry is further configured to disconnect power from all components of the hearing assistance device other than at least one of the magnetic sensor or the IMU.

In Example 7, the subject matter of Examples 1-6 includes, wherein the processing circuitry is further configured to determine that a second gesture has occurred, and in response place the hearing assistance device in a shelf mode by disconnecting all power in the hearing assistance device.

In Example 8, the subject matter of Examples 1-7 includes, wherein when the hearing assistance device is put in a case, the processing circuitry is configured to turn off power at the hearing assistance device based on a change in magnetic field caused by a magnet in the case.

In Example 9, the subject matter of Examples 1-8 includes, wherein the processing circuitry is further configured to determine that a second gesture has occurred, and in response control volume of a speaker of the hearing assistance device.

In Example 10, the subject matter of Examples 1-9 includes, wherein the processing circuitry is further configured to determine that the gesture has occurred when the change in acceleration corresponds to an acceleration greater than a threshold acceleration.

Example 11 is a method comprising: receiving information about a change in a magnetic field from a magnetic sensor in a hearing assistance device; receiving acceleration information from an inertial measurement unit (IMU) in the hearing assistance device; determining that a gesture has occurred based on the received information; and in response to determining that the gesture has occurred, changing a device operating status of the hearing assistance device mode.

In Example 12, the subject matter of Example 11 includes, wherein the magnetic sensor is a magnetometer sensitive to the giant magnetoresistance (GMR) effect.

In Example 13, the subject matter of Examples 11-12 includes, causing the hearing assistance device to change the device operating status of the hearing assistance device when the change in the magnetic field and the change in acceleration occur within a specified time period.

In Example 14, the subject matter of Examples 11-13 includes, wherein determining that the gesture has occurred includes determining that a double tap has occurred on the hearing assistance device.

In Example 15, the subject matter of Examples 11-14 includes, sending an indication to a paired hearing assistance device, in response to determining that the gesture has occurred, the indication configured to cause the paired hearing assistance device to change a corresponding device operating status of the paired hearing assistance device.

In Example 16, the subject matter of Examples 1-15 includes, wherein changing the device operating status includes disconnecting power from all components of the hearing assistance device other than at least one of the magnetic sensor or the IMU.

In Example 17, the subject matter of Examples 11-16 includes, determining that a second gesture has occurred, and in response placing the hearing assistance device in a shelf mode by disconnecting all power in the hearing assistance device.

In Example 18, the subject matter of Examples 11-17 includes, disconnecting power in the hearing assistance device when the hearing assistance device is proximal to a magnet in a case based on a change in magnetic field caused by the magnet in the case.

In Example 19, the subject matter of Examples 11-18 includes, determining that a second gesture has occurred, and in response, controlling volume of a speaker of the hearing assistance device.

In Example 20, the subject matter of Examples 11-19 includes, wherein determining that the gesture has occurred includes determining that the change in acceleration exceeds a threshold acceleration change.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A hearing assistance device comprising:

a magnetic sensor configured to output a magnetic field-indicating signal based on a change in a magnetic field at the hearing assistance device;

an inertial measurement unit (IMU) configured to output an acceleration-indicating signal based on a change in acceleration at the hearing assistance device; and processing circuitry configured to:

receive the magnetic field-indicating signal and the acceleration-indicating signal;

determine that a gesture has occurred with a second hearing assistance device based on the received signals, the gesture determined based on detection of a specified combination including the change in the magnetic field and the change in the acceleration and the gesture including a relative movement of the hearing assistance device toward the second hearing assistance device; and in response to determining that the gesture has occurred, change a device operating status of the hearing assistance device.

2. The hearing assistance device of claim 1, wherein the magnetic sensor is a magnetometer sensitive to the giant magnetoresistance (GMR) effect.

3. The hearing assistance device of claim 1, wherein the processing circuitry is configured to cause the hearing assistance device to change the device operating status of the hearing assistance device when the change in the magnetic field and the change in acceleration occur within a specified time period.

4. The hearing assistance device of claim 1, wherein to determine that the gesture has occurred, the processing circuitry is further configured to determine that a double tap has occurred on the hearing assistance device.

5. The hearing assistance device of claim 1, wherein the processing circuitry is further configured to send an indication to the second hearing assistance device, in response to determining that the gesture has occurred, the indication configured to cause the second hearing assistance device to wake up.

6. The hearing assistance device of claim 1, wherein to change the device operating status, the processing circuitry is further configured to disconnect power from all components of the hearing assistance device other than at least one of the magnetic sensor or the IMU.

7. The hearing assistance device of claim 1, wherein the processing circuitry is further configured to determine that a second gesture has occurred, and in response place the hearing assistance device in a shelf mode by disconnecting all power in the hearing assistance device.

8. The hearing assistance device of claim 1, wherein when the hearing assistance device is put in a case, the processing circuitry is configured to turn off power at the hearing assistance device based on a change in magnetic field caused by a magnet in the case.

9. The hearing assistance device of claim 1, wherein the processing circuitry is further configured to determine that a second gesture has occurred, and in response control volume of a speaker of the hearing assistance device.

10. The hearing assistance device of claim 1, wherein the processing circuitry is further configured to determine that the gesture has occurred when the change in acceleration corresponds to an acceleration greater than a threshold acceleration.

11. A method comprising:

receiving information about a change in a magnetic field from a magnetic sensor in a hearing assistance device;

receiving acceleration information from an inertial measurement unit (IMU) in the hearing assistance device;

determining that a gesture has occurred with a second hearing assistance device based on the information about the change in the magnetic field and the acceleration information, the gesture determined based on detection of a specified combination including the change in the magnetic field and the change in the acceleration and the gesture including a relative movement of the hearing assistance device toward the second hearing assistance device; and in response to determining that the gesture has occurred, changing a device operating status of the hearing assistance device.

12. The method of claim 11, wherein the magnetic sensor is a magnetometer sensitive to the giant magnetoresistance (GMR) effect.

13. The method of claim 11, further comprising causing the hearing assistance device to change the device operating status of the hearing assistance device when the change in the magnetic field and the change in acceleration occur within a specified time period.

14. The method of claim 11, wherein determining that the gesture has occurred includes determining that a double tap has occurred on the hearing assistance device.

15. The method of claim 11, further comprising sending an indication to a paired hearing assistance device, in response to determining that the gesture has occurred, the indication configured to cause the paired hearing assistance device to change a corresponding device operating status of the paired hearing assistance device.

16. The method of claim 11, wherein changing the device operating status includes disconnecting power from all components of the hearing assistance device other than at least one of the magnetic sensor or the IMU.

17. The method of claim 11, further comprising determining that a second gesture has occurred, and in response placing the hearing assistance device in a shelf mode by disconnecting all power in the hearing assistance device.

18. The method of claim 11, further comprising disconnecting power in the hearing assistance device when the hearing assistance device is proximal to a magnet in a case based on a change in magnetic field caused by the magnet in the case.

19. The method of claim 11, further comprising determining that a second gesture has occurred, and in response, controlling volume of a speaker of the hearing assistance device.

20. The method of claim 11, wherein determining that the gesture has occurred includes determining that the change in acceleration exceeds a threshold acceleration change.

* * * * *